United States Patent [19]

Hara et al.

[11] Patent Number: 4,815,514
[45] Date of Patent: Mar. 28, 1989

[54] BELTED TIRE

[75] Inventors: Hideo Hara, Kodaira; Tadashi Maehara, Ohme; Masahazu Eshima, Higashiyamato; Hirofumi Morita, Kodaira; Hiroshi Kojima, Hino, all of Japan

[73] Assignee: Bridgestone Corporation, Tokyo, Japan

[21] Appl. No.: 38,577

[22] Filed: Apr. 15, 1987

[30] Foreign Application Priority Data

Apr. 15, 1986 [JP] Japan ................... 61-84877

[51] Int. Cl.⁴ .............................. B60C 9/18
[52] U.S. Cl. .................... 152/531; 152/535; 152/536
[58] Field of Search ............... 152/531, 533, 535, 536, 152/538; 156/130, 126, 157, 123, 130.3

[56] References Cited

U.S. PATENT DOCUMENTS

| 2,945,525 | 7/1960 | Lugli | 152/533 |
| 2,982,328 | 5/1961 | Emanueli et al. | 152/531 X |
| 3,503,432 | 3/1970 | Maiocchi | 152/531 X |
| 4,183,391 | 1/1980 | Romand | 152/536 X |

FOREIGN PATENT DOCUMENTS

| 2201623 | 7/1972 | Fed. Rep. of Germany | 152/531 |
| 2821093 | 11/1979 | Fed. Rep. of Germany | 152/531 |
| 57-26003 | 2/1982 | Japan | 152/536 |
| 1303955 | 1/1973 | United Kingdom |  |
| 1318749 | 1/1973 | United Kingdom |  |

Primary Examiner—Michael W. Ball
Assistant Examiner—Ramon R. Hoch
Attorney, Agent, or Firm—Sughrue, Mion, Zinn, Macpeak & Seas

[57] ABSTRACT

To improve traveling stability, riding comfort, high-speed durability, etc., the uniformity in the main belt of a belted tire is improved by dividing an auxiliary layer into at least three areas in an axial direction of the tire, and both ends of the three divided auxiliary layers are bonded in the divided areas at different bonding positions, respectively, in circumferentially spaced relationship to each other. In particular, lateral force variation of the tire is reduced and separation trouble at the auxiliary layer bonding area can be settled.

7 Claims, 4 Drawing Sheets

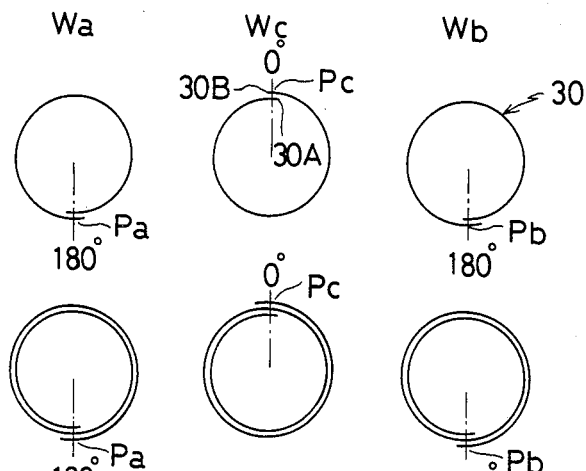
FIG. 3A
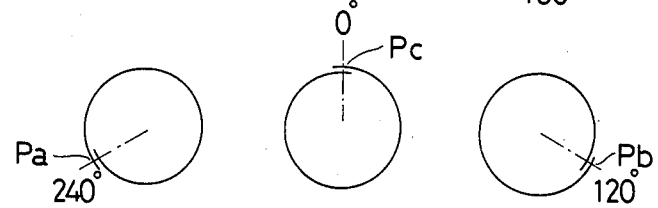
FIG. 3B
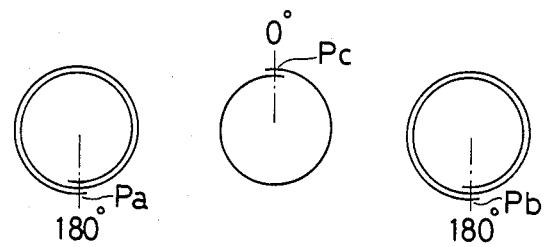
FIG. 3C
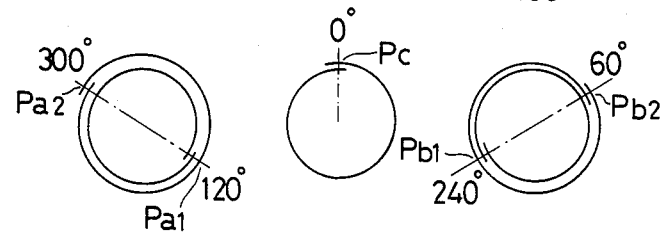
FIG. 4A
FIG. 4B

BELTED TIRE

BACKGROUND OF THE INVENTION

1. Field of the Invention

The present invention relates to a belted tire, and more specifically to a belted tire in which auxiliary layer arrangement over the outermost belt is improved for providing better tire uniformity.

2. Description of the Prior Art

With reference to Figs. 1A and 1B, the structure of a belted tire E will be described hereinbelow. The tire E is composed of a toroidal carcass 10, a main belt 20, and an auxiliary layer 30. The main belt 20 includes a first ply (layer) $20_1$ and a second ply $20_2$, for instance, each formed by arranging non-stretchable cords $21_1$ or $21_2$ so as to cross the tire equatorial plane C (central circumference) at a small angle over the carcass 10 and laid one upon another so that the arranged cords of the two plies intersect each other. The auxiliary layer 30 is formed by arranging heat-shrinkable cords 31 on the outermost layer of the main belt 20 substantially over all of the belt 20 in parallel to the equatorial plane C for providing a hoop effect. Further, in FIG. 1A, T denotes a tire tread formed on a crown portion of the tire E.

The auxiliary layer 30 is formed by winding a sheet made of heat-shrinkable cords under tension and by bonding both the ends 30A and 30B of the sheet 30 laid overlapping each other by a distance S.

A green tire thus formed is put into a vulcanizing metallic mold for vulcanization. In this process, there exists a problem in that the diameter of the green tire increases a little and therefore the bonding area M of the auxiliary layer 30 is dislocated in the tire circumferential direction by a distance corresponding to an increase in the tire diameter. This is because a bladder press (for simultaneously forming and vulcanizing a pneumatic tire) pressurizes and heats the green tire from the inside thereof by steam.

The above-mentioned drawbacks can be confirmed through an X-ray photograph. FIG. 1B shows a distortion of the main belt 20 near the bonding area M of the auxiliary layer 30, in which the first ply $20_1$ and the second ply $20_2$ both arranged symmetrical with respect to the equatorial plane at least in the auxiliary layer forming process are deformed and vulcanized, due to heat and pressure applied from the bladder press to the tire.

The belted tire in which the main belt 20 is not uniformly formed along the tire circumferential direction as described above involves various problems with respect to tire performance, in particular, from the viewpoint of LFV (lateral force variation), thus degrading traveling stability, durability, riding comfort, etc.

SUMMARY OF THE INVENTION

With these problems in mind, therefore, it is the primary object of the present invention to provide a belted tire which can improve the uniformity in the main belt along the circumferential direction of the tire in order to provide an excellent tire performance such as LFV in particular. The uniformity in the main belt can necessarily improve tire traveling stability, riding comfort, high-speed durability, etc. without causing tire separation trouble such that the bonding areas of the auxiliary layer are separated after high-speed many-hour tire traveling.

To achieve the above-mentioned object, in a belted tire having a toroidal carcass having at least one radial ply, a main belt layer composed of at least two plies each formed by arranging non-stretchable cords on the carcass so as to cross a tire equatorial plane at a small angle (10 to 30 degrees with respect to the equatorial plane of the tire and laid one upon another so that the arranged cords of the two plies intersect each other, and at least single auxiliary layer formed by arranging heat-shrinkable cords substantially all over the main belt in parallel to the equatorial plane of the tire, the present invention is characterized in that said auxiliary layer is divided into at least three layers in an axial direction of the tire, and both circumferential ends of said at least three divided auxiliary layers are bonded at different bonding positions, respectively, within at least three areas in circumferentially spaced relationship to each other.

The bonding positions of at least three auxiliary layers are uniformly distributed along the circumference of the tire to improve the uniformity of the main belt layer. The circumferential space between two adjacent bonding position is approximately 60 or 120 degrees. Further, it is preferable to incline the longitudinal direction of each of the bonding areas at an angle with respect to the lateral direction of the tire tread.

BRIEF DESCRIPTION OF THE DRAWINGS

The features and advantages of the belted tire according to the present invention over the prior art tire will be more clearly appreciated from the following description of the preferred embodiment of the invention taken in conjunction with the accompanying drawings in which like reference numerals designate the same or similar elements or sections throughout the figure thereof and in which:

FIGS. 3A, 3B, 3C, 4A and 4B are illustrations for assistance in explaining various bonding positions of three auxiliary layers spaced along the tire circumference at three different areas separated along the lateral direction of the tire, in the first and second embodiments of the belted tire according to the present invention.

DETAILED DESCRIPTION OF THE PREFERRED EMBODIMENTS

Figure 1:
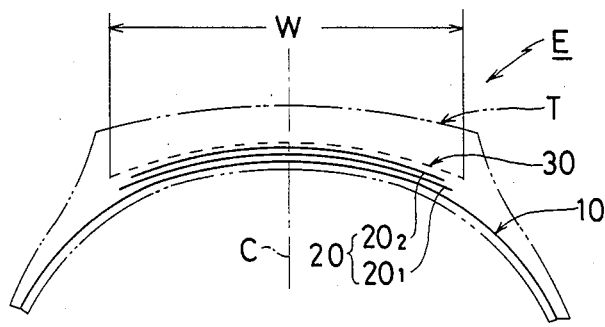
FIG. 1A is a diagrammatical cross-sectional view of a prior art belted tire, taken along a radial surface thereof.
FIG. 1B is a partial diagrammatical top view of the prior art belted tire shown in FIG. 1A.
Figure 1:
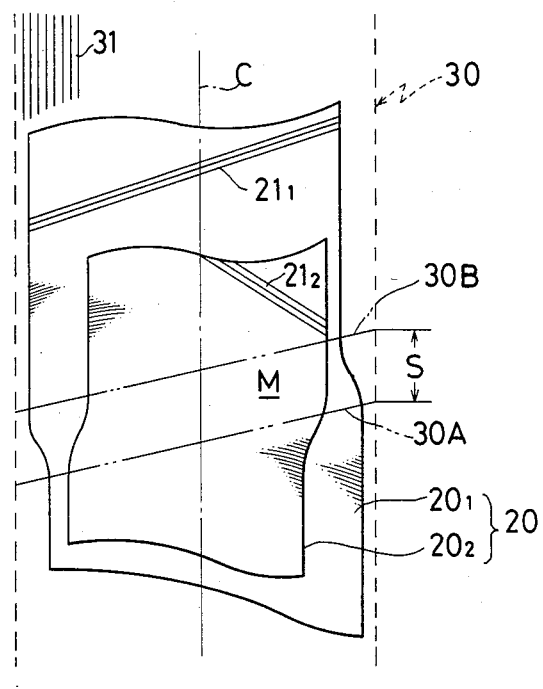
Figure 2A:
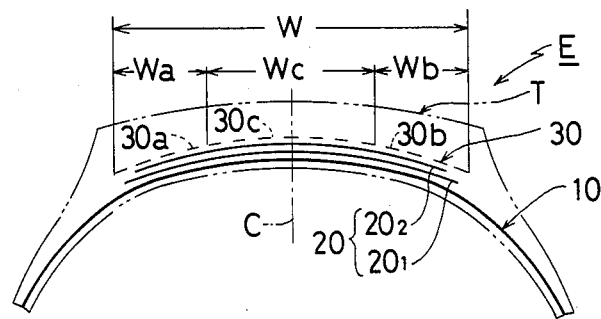
FIG. 2A is a diagrammatical cross-sectional view of a first embodiment of the belted tire according to the present invention, taken along a radial surface thereof.
Figure 2B:
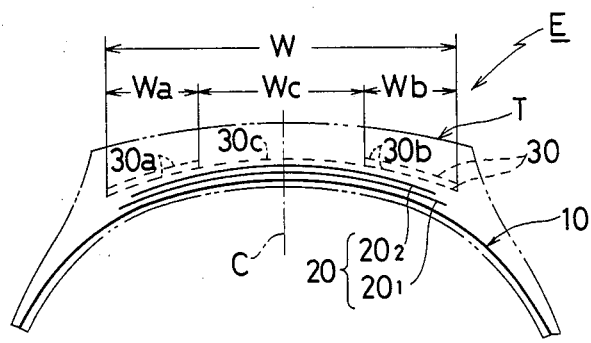
FIG. 2B is a similar view of a second embodiment of the belted tire according to the present invention.

FIGS. 2A and 2B show a cross-sectional view of a belted tire according to the present invention, respectively. As already described with reference to FIGS. 1A and 1B, the tire E is composed of the toroidal carcass 10, the main belt 20 including first and second plies $20_1$ and $20_2$, and the auxiliary layer 30.

In the tire of the present invention, the auxiliary layer 30 is divided into at least three, left, central and right, areas Wa, Wc and Wb in the axial direction of the tire or in the lateral direction along the tire tread T. The feature of the belted tire according to the present invention is to bond both circumferential ends of each of the three divided auxiliary layers 30a, 30c and 30b at three different bonding positions dislocated along the circumferential direction of the tire in circumferentially spaced relationship to each other.

This feature will be described in further detail with referent to FIGS. 3A, 3B, 3C, 4A and 4B together with FIGS. 2A and 2B.

FIG. 2A shows a first embodiment of the present invention in which a single auxiliary layer 30 (30a, 30c, 30b) is provided over the main belt 20, while FIG. 2B shows a second embodiment thereof in which two auxiliary layers 30a and 30b are provided over the main belt 20 at the left and right areas Wa and Wb, and a single auxiliary layer 30c is provided over the central area Wc in the main belt 20.

The number of multiple auxiliary layer 30 can be increased or decreased according to the usage of tires, without being limited to one or two layers. In addition, the number of the divided areas on the main belt layer 20 along the lateral direction of the tread T can also be increased according to the usage of tires (e.g. four or five areas), without being limited to three areas as shown in FIGS. 2A or 2B.

It is preferable to determine the total width W of the auxiliary layer 30 to be equal to or a little wider than that of the main belt 20 from the standpoint of improvement in the hoop effect of the auxiliary layer 30.

Where the total width W of the auxiliary layer 30 is divided into three areas, it is preferable to determine the width of the area Wa or Wb to be 15 to 40% of the total width W. If the width of the area Wa or Wb is less than 15% or more than 40%, since the width of the central area Wc becomes excessively wide or narrow, this is not preferable because the tread rigidity is unbalanced along the lateral direction of the tread. Therefore, it is preferable to roughly equalize the widths of the areas Wa, Wc and Wb as shown in FIGS. 2A or 2B.

FIG. 3A shows a first modification of the first embodiment shown in FIG. 2A. In FIG. 3A, a single layer 30 is wound around the main belt 20 being equally divided into three areas Wa, Wc and Wb along the tread lateral direction, and two bonding positions Pa, Pb at which two circumferential ends 30A and 30B are bonded are located 180 degrees out of phase with the central bonding position Pc.

FIG. 3B shows a second modification of the first embodiment shown in FIG. 2A. In the drawings, two layers 30 are formed around the main belt 20 being equally divided into three areas Wa, Wc and Wb, and two bonding positions Pa, and Pb are located 180 degrees out of phase with the central bonding position Pc.

FIG. 3C shows a third modification of the first embodiment shown in FIG. 2A. In this drawing, a single layer 0 is wound around the main belt 20 being equally divided into three areas Wa, Wc and Wb along the tread lateral direction, and two bonding positions Pa and Pb are located 120 and 240 degrees out of phase with the central bonding position Pc.

FIG. 4A is a first modification of the second embodiment shown in FIG. 2B. In the drawings, a single layer 30c is wound around the main belt layer 20 only at the central area Wc and two layers 30a or 30b are wound around the left and right areas Wa and Wb, and two bonding positions Pa and Pb are located 180 degrees out of phase with the central bonding position Pc.

FIG. 4B is a second modification of the second embodiment shown in FIG. 2B. In the drawings, a single layer 30c is wound around the main belt 20 only at the central area Wc and two layers 30a and 30b are wound around the left and right areas Wa and Wb. Further, the left layer 30a is divided into two, and an inner bonding position Pa1 is located 120 degrees out of phase with the central bonding position Pc of the central layer 30c, while an outer bonding position Pa2 is located 300 degrees out of phase with the central bonding position Pc. Similarly, the right layer 30b is divided into two, and an inner bonding position Pb1 is located 240 degrees out of phase with the central bonding position Pc, while an outer bonding position Pb2 is located 60 degrees out of phase with the central bonding position Pc.

In the above description, the bonding positions Pa and Pb of the auxiliary layer 30 spaced away from the central position Pc can be located within appropriate angular ranges, as long as the bonding positions are uniformly distributed along the circumferential direction in relation to three adjoining areas of Wa, Wc and Wb. Here, it should be noted that when the bonding positions of the heat-shrinkable auxiliary layer 30 are well balanced, the distortion of the main belt 20 can be prevented and therefore the uniformity thereof can be improved.

Figure 5A:
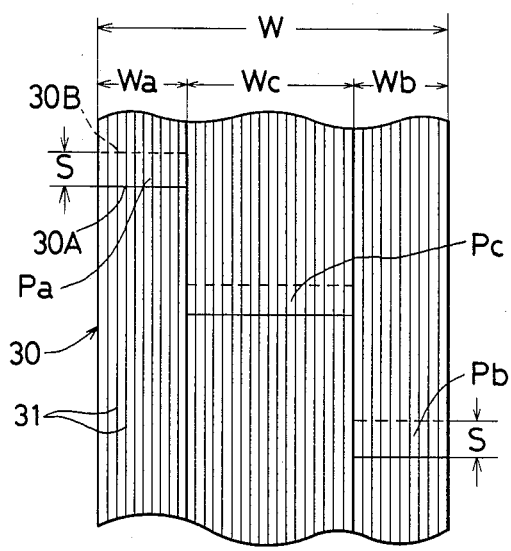
FIGS. 5A and 5B are illustrations for assistance in explaining the bonding areas of the auxiliary layers of the belted tire according to the present invention.
Figure 5B:
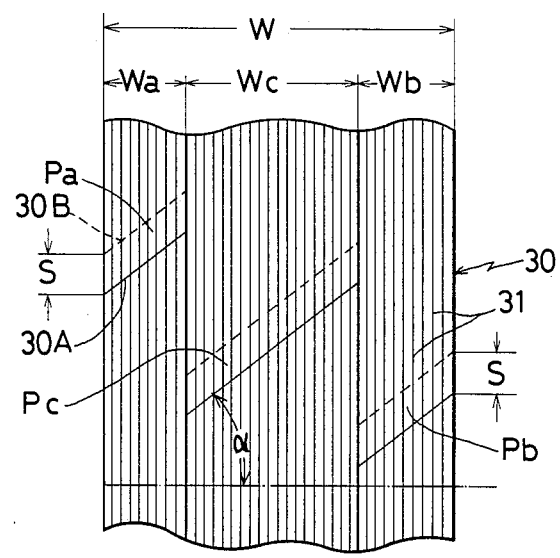

The width S of the bonding areas Pa, Pc and Pb at which two circumferential ends 30A and 30B of the auxiliary layer 30 are overlapped is preferably about 50 mm, and the longitudinal direction of the bonding areas is perpendicular to the circumferential direction of the tire as depicted in FIG. 5A or inclined at an angle $\alpha$ (10 to 80 degrees) from a line perpendicular to the tire circumferential direction as depicted in FIG. 5B.

As described above, in the belted tire according to the present invention, since the bonding positions at which two ends 30A and 30B of the tree divided auxiliary layers 30a, 30c, 30b are bonded, respectively are separated into three different areas along the axial direction of the tire and spaced along the circumferential direction of the tire, it is possible to improve the uniformity of the auxiliary layer 30 and therefore to prevent the distortion of the main belt layer 20.

Further, in the belted tire according to the present invention, the cord 31 forming the auxiliary layer 30 is preferably an organic fiber cord such as nylon cord or polyester cord having an excellent bonding force relative to rubber or to the cord 21 forming the main belt 20 and an appropriate heat shrinkability. Further, nylon cord is particularly preferable under consideration of heat generated from the tread during traveling, because nylon cord has a high bonding strength relative to the cord 21 forming the main belt 20 and a high heat resistance.

Further, organic fiber cord represented by nylon, polyester, rayon, aromatic polyamide fiber cord or metal cord such as steel cord is usable for the reinforcement cord of the carcass 10.

In the embodiments described above, the carcass is of radial structure type. However, it is also possible to form the carcass in belted-bias structure.

Further, non-stretchable cord such as steel cord or aromatic polyamide fiber cord is usable for the reinforcement cord of the main belt 20.

Test Results

The following tests have been effected to verify the effects of the belted tires according to the present invention in comparison with prior-art tires:

[1] Specifications of Test Tires of the Present Invention (a) Tire size: 165 SR 13

(b) Tire structure: As shown in FIG. 2B. The auxiliary layer 30 on the main belt side is divided into three areas Wa, Wc, Wb as depicted in FIG. 2B.

(c) Carcass 10: Two plies are formed by use of nylon cord 1260d/2 inclined at 90 degrees with respect to the equatorial plane of the tire.

(d) Main belt 20: Two plies are formed so as to intersect each other by use of steel cord $1\times5\times0.23$ inclined at 22 degrees with respect to the equatorial plane. The max. width is 120 mm.

(e) Aux. layer 30: As shown in FIGS. 2B and 4A. Two plies are formed by use of nylon cord 1260d/2 (the number of cord ends: 26.4 cords/25 mm) in parallel to the equatorial plane. The total width W is 130 mm. The left and right area widths Wa and Wb are 25 mm, respectively. The central area width Wc is 80 mm. Two bonding positions Pa and Pb of the areas Wa and Wb are located 180 degrees out of phase with that of the central area Wc. The inclination angle $\alpha$ of the bonding area is 60 degrees. The overlapped width S of the bonding area is 50 mm.

[2] Specifications of Prior Art Test Tires (a) Tire size: The same as the invention (b) Tire structure: The same.

(c) Carcass 10: The same (d) Main belt 20: The same (e) Aux. layer 30: The same. However, the auxiliary layer on the main belt side is not divided. Two bonding positions Pa and Pb at the areas Wa and Wb of the auxiliary layer only on the tread side are located 180 degrees out of phase with a bonding position of the auxiliary layer on the main belt.

[3] Method of Measuring Tire Uniformity

The measurement was effected in accordance with JASO C607.

The table 1 below shows test results, in which uniformity is indicated as indices in comparison with the prior-art tire (100). The smaller the indices are, the better will be the uniformity.

|  | Prior Art | Invention |
| --- | --- | --- |
| Radial force variation | 100 | 85 |
| Lateral force variation | 100 | 75 |

The above table indicates that the uniformity of the tire according to the present invention is fairly improved.

[4] High Speed Endurance Test

Test conditions were as follows:

| (a) | Rim | 4½ J | |
| --- | --- | --- | --- |
| (b) | Inflation pressure | 2.1 kg/cm² | |
| (c) | Load | 425 kg | |
| (d) | Drum | Dia. 1700 mm | Flat surface |
| (e) | Temperature | 38 ± 3° C. | |
| (f) | Speed and time | 81 km/hr | 2 hr |
| | Left for 3 hours at rest | | |
| | 121 Km/hr | 0.5 hr | |
| | 131 Km/hr | 0.5 hr | |
| | 140 Km/hr | 0.5 hr | |
| | 145 Km/hr | 0.5 hr | |
| | 153 Km/hr | 0.5 hr | |
| | 161 Km/hr | 0.5 hr | |
| | 169 Km/hr | 0.5 hr | |
| | 177 Km/hr | 0.5 hr | |
| | 185 Km/hr | 0.5 hr | |

(g) Test results:

In the prior-art tires, the bonding area of the auxiliary layer 30 was separated after the endurance test of 169 km/hr×24 minutes. On the other hand, in the tires of the present invention, the bonding areas of the auxiliary layer 30 were not separated after the above listed endurance test of 185 km/hr×0.5 hr. The above test results indicate that the tires of the present invention excel over the prior-art tires in high speed durability without being subjected to separation trouble of the bonding areas in the auxiliary layer of the tires.

What is claimed is:

1. A belted tire comprising; a toroidal carcass, a main belt composed of at least two plies each formed by arranging non-stretchable cords on the carcass so as to cross an equatorial plane of the tire at an angle and laid one upon another so that the arranged cords of the two plies intersect each other, and at least one auxiliary layer formed by arranging heat-shrinkable cords above and substantially completely across the width of the main belt in parallel to the equatorial plane, said auxiliary layer is divided into at least three separate strips composed of a strip in the central area and strips in right and left lateral areas in an axial direction of the tire, and both circumferential ends of each of said strip in the central area and said strips in the right and left areas are bonded at different bonding positions completely dislocated from a bonding position of an adjoining auxiliary layer strip along the circumferential direction of the tire in a circumferential spaced relationship to each other so that said bonding positions of said strips in the right and left areas are displaced with respect to said bonding position of said strip in the central area.

2. The belted tire as set forth in claim 1, wherein a single auxiliary layer is formed over central, right and left lateral areas, respectively, and both circumferential ends of the single auxiliary layer strips in the right and left areas are bonded at positions of the strip circumferentially about 180 degrees out of phase with a bonding position in the central area.

3. The belted tire as set forth in claim 1, wherein two auxiliary layers are formed over central, right and left lateral areas, respectively, and both circumferential ends of the two auxiliary layers in the right and left areas are bonded at positions of the strip circumferentially about 180 degrees out of phase with a bonding position in the central area.

4. The belted tire as set forth in claim 1, wherein a single auxiliary layer is formed over central, right and left lateral areas, respectively, and both circumferential ends of the single auxiliary layer trip in the right area are bonded at a position circumferentially about 120 degrees out of phase with a bonding position of said strip in the central area and both circumferential ends of the single auxiliary layer strip in the left area are bonded at a position circumferentially about 240 degrees out of phase with the bonding position of the strip in the central area.

5. The belted tire as set forth in claim 1, wherein a single auxiliary layer is formed over a central lateral area and two auxiliary layers are formed respectively over left and right lateral areas, respectively, and both circumferential ends of said two auxiliary layer strips are bonded at a position circumferentially about 180 degrees out of phase with a bonding position at which the single auxiliary layer strip is bonded.

6. The belted tire as set forth in claim I, wherein a single auxiliary layer is formed over a central lateral area and two auxiliary layers are formed respectively over left and right lateral areas; both outer circumferential ends of said two auxiliary layer strips in the left area are bonded at a bonding position circumferentially about 300 degrees out of phase with a central bonding position at which the single auxiliary layer strip is boned; both inner circumferential ends of the two auxiliary layer strips in the left area are bonded at a bonding position circumferential about 120 degrees out of phase with the central bonding position; both outer circumferential ends of the two auxiliary layer strips in the right area are bonded at a bonding position circumferentially about 60 degrees out of phase with the central bonding position; and both inner circumferential ends of the two auxiliary layer strips in the right area are bonded at a bonding position circumferentially about 240 degrees out of phase with the central bonding position.

7. The belted tire as set forth in claim 1, wherein a longitudinal direction of each of at least three bonding areas at which both circumferential ends of said at least three divided auxiliary layer strips are bonded is inclined at an angle with respect to a lateral direction of a tire tread.

* * * * *